United States Patent [19]
Eschbach

[11] Patent Number: 5,357,352
[45] Date of Patent: Oct. 18, 1994

[54] IMAGE-DEPENDENT COLOR SHIFTING OF STRONGLY COLOR SHIFTED IMAGES

[75] Inventor: Reiner Eschbach, Webster, N.Y.

[73] Assignee: Xerox Corporation, Stamford, Conn.

[21] Appl. No.: 131,172

[22] Filed: Oct. 4, 1993

[51] Int. Cl.$^5$ ............................................. A04N 1/46
[52] U.S. Cl. ................................................ 358/518
[58] Field of Search .................. 358/36, 37, 21 R, 21, 358/27, 28, 518, 520; 348/607, 621, 624, 645, 646, 647, 649, 708, 663

[56] References Cited

U.S. PATENT DOCUMENTS 2,571,697 10/1951 Evans ........................................ 95/2
4,179,705 12/1979 Faroudj ................................. 358/31

OTHER PUBLICATIONS

Xerox Color Encoping Standard XN55 289005, 1989.

*Primary Examiner*—Edward L. Coles, Sr.
*Assistant Examiner*—Jerome Grant, II
*Attorney, Agent, or Firm*—Mark Costello

[57] ABSTRACT

A method of correcting color shifts produced by improper imaging in a natural scene image including the steps of: converting an electronically encoded natural scene image described in terms of red-green-blue color space to electronic encoding terms of luminance, chrominance color space; sorting each luminance signal forming the image into one of a plurality of predetermined luminance magnitude bands; for each luminance magnitude band, calculating the band average chrominance signal of each pixel in the band to determine the relative amounts of each color in the band; for each band average chrominance signals, averaging the band average chrominance signals over a subset of the luminance magnitude bands to derive an interband average chrominance value; comparing each interband average chrominance value with neutral gray color to determine a correction signal; for each luminance magnitude band, adding the correction signal to the color of each pixel in the band.

12 Claims, 4 Drawing Sheets

IMAGE-DEPENDENT COLOR SHIFTING OF STRONGLY COLOR SHIFTED IMAGES

The present invention is directed towards a method and apparatus for image-dependent color shifting in electronic documents of strongly color shifted natural scene images.

INCORPORATION BY REFERENCE

U.S. Pat. No. 2,571,697 to Evans is herein incorporated by reference for its teachings.

BACKGROUND OF THE INVENTION

In the past, a typical application for copiers or scan-to-print image processing systems was to reproduce an input image as accurately as possible, i.e., render a copy. Thus, copies have been rendered as accurately as possible, flaws and all. However, as customers become more knowledgeable in their document reproduction requirements, they recognize that an exact copy is often not what they want. Instead, they would rather obtain the best possible document output. Until recently, image quality from the output of a copier or a scan-to-print system was directly related to the input document quality. One very common set of input documents includes photographs. Unfortunately, photography is an inexact science, particularly among amateurs, and original photographs are often poor. Alternately, technology, age or image degradation variations result in pictures having an unsatisfactory and undesirable appearance. What is desired then, is a copy giving the best possible picture, and not a copy of the original.

Three possible choices are presented in the area of image enhancement. In the first case, we can do nothing. Such a system is a stable system, in that it does no harm to an image. This is a common approach taken to reproduction. However, the output documents of such a system are sometimes not satisfactory to the ultimate customer.

In a second case of image enhancement, the image can always be processed. It turns out than an improvement can usually be made to an image if certain assumptions are made that are accurate for most cases. This model fails in multi-generation copies, or where the original image was in fact, correct.

Accordingly, we arrive at our third case of image enhancement, a process of automated image enhancement which operates to vary images which are not perceived as good images, but does not operate on images which do not need to be improved.

One improvement that can be made to an image is correction of color shifts. When photographic color prints (a significant image source for electronic images) are made from negative or positive color images, the overall colors of the print frequently do not correspond to those desired. This may arise from a number of causes, such as change in sensitivity of the film due to aging, use of incorrect lighting, error in print processing and the like. If an exact print is made from such pictures based on the sensitivity which the film should have had, i.e., assuming that the positive or negative was correct, then the printer, particularly if a reflection prints (as opposed to a transparency) will display the errors to a greater extent than the transparency because such printers are nearly always viewed under conditions in which there are comparison objects. Of course, electronic images can only reproduce what is recorded, but given the possibility of pixel by pixel color editing.

U.S. Pat. No. 2,571,697 to Evans teaches that in photographic processes, an overall color shift can be made to the image without knowledge of the original colors. Starting with the assumption that if light passes though the printing apparatus onto a printing material without a color image or other obstruction in the light beam, the printing light should produce a neutral gray (approximately). For a color shifted image, if light which will reproduce substantially as gray on the printing material is permitted to pass though the transparency so that a uniform amount of the light strikes the transparency at all points, the light passing through the transparency usually will not print as neutral gray, but will deviate from gray by an appreciable amount. The light which passes through the transparency is collected or integrated and each component primary color forming the light is measured by the use of a photoelectric cell. By comparing the amount of these colors received after passing through the transparency with the amount of these colors in light from the light source, a correction factor can be determined, and an adjusted light source can be provided, by inserting a filter in the light path.

It will no doubt be appreciated that the photographic correction process described in U.S. Pat. No. 2,571,697 to Evans is limited to changes across the entire image, limited to filters available; limited to corrections to each component color, and limited to uniform analog changes over the entire input intensity range.

SUMMARY OF THE INVENTION

In accordance with the invention, there is provided a method of correcting color shifts produced by improper imaging in a natural scene image.

In accordance with one aspect of the invention, there is provided a method of correcting color shifts produced by improper imaging in a natural scene image including the steps of: converting an electronically encoded natural scene image described in terms of red-green-blue color space to an electronic encoding terms of luminance, chrominance color space; sorting each luminance signal forming the image into one of a plurality of predetermined luminance magnitude bands; for each luminance magnitude band, calculating the average band chrominance signal in the band to determine the relative amounts of each color in the band; using weighted average chrominance signals, averaging the band chrominance signals chrominance over a subset of the luminance magnitude bands to derive an weighted average chrominance value; comparing the weighted average chrominance value with neutral gray color to determine a correction signal; for each luminance magnitude band, adding the correction signal to the color of each pixel in the band.

The described process determines for a given brightness band the deviation from gray of the image. Clearly, if the image is not color shifted, relatively little color correction will occur. Additionally, operating on the image by luminance brightness bands arrangement mitigates the problems of the usual image composition centered on a single color from causing a color shift to occur over an entire image.

In accordance with another aspect of the invention, the described color shifting process optimally addresses strongly color shifted images, and accordingly detection of strongly shifted color image might be achieved by comparing the variation of the color as defined in the chrominance signals over the luminance band with a threshold signal, to determine whether the image is strong color shifted. This detection can be used to prevent operation on the image in cases where the benefits are minimal.

These and other aspects of the invention will become apparent from the following descriptions used to illustrate the preferred embodiment of the invention, read in conjunction with the accompanying drawings in which.

DETAILED DESCRIPTION OF THE INVENTION

Figure 1:
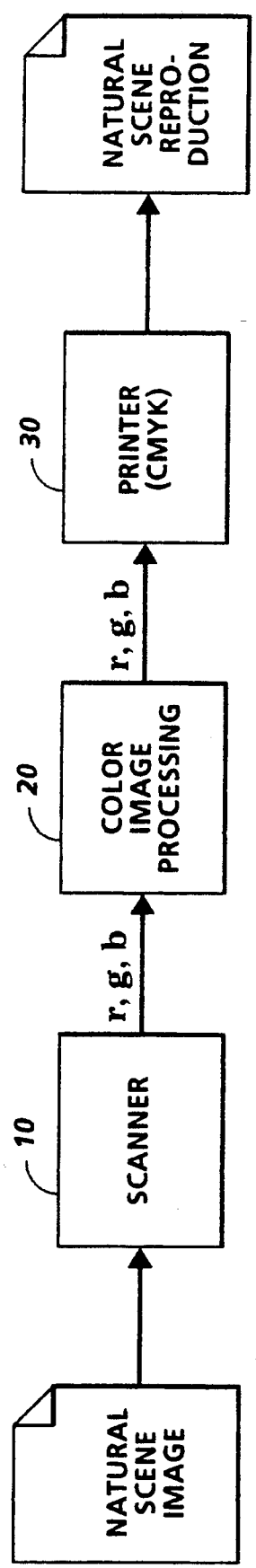
FIG. 1 shows a block diagram of a system employing the present invention.

Referring now to the drawings where the showings are for the purpose of describing the embodiment of the invention and not for limiting same, reference is made to FIG. 1 which scan-to-print system in which the present invention may find advantageous use. In the present invention, natural scene images, typically the result of a photographic process, as opposed to computer generated imagery, are scanned at a scanner 10 or the like. Scanner 10 represents a device, which may include a slide scanner, a document scanner, an electronic camera etc., for reducing a visible image to electronic signals. The electronic signals produced by the scanner 10 are commonly defined in terms of a standard CIE color space or alternatively, are convertible to such space such as the color spaces described in the "Xerox Color Encoding Standard," XNSS 289005, 1989. These signals are edited, enhanced and prepared for printing at color image processing unit 20, which in FIG. 1 provides as an output r, g, b signals. Printer 30 receives the signal from color image processing unit 20, and provides for conversion of the signals to printer driver signals, commonly given in terms of the colorants that will be used in reproduction, typically Cyan, Magenta, Yellow and Key or black (CMYK). The printer has an output of the natural scene image, which, hopefully, closely resembles the scene viewed by the user originally. Alternatively, the processed image from color image processing unit 20 is displayed on a television screen, CRT display or the like.

Figure 2:
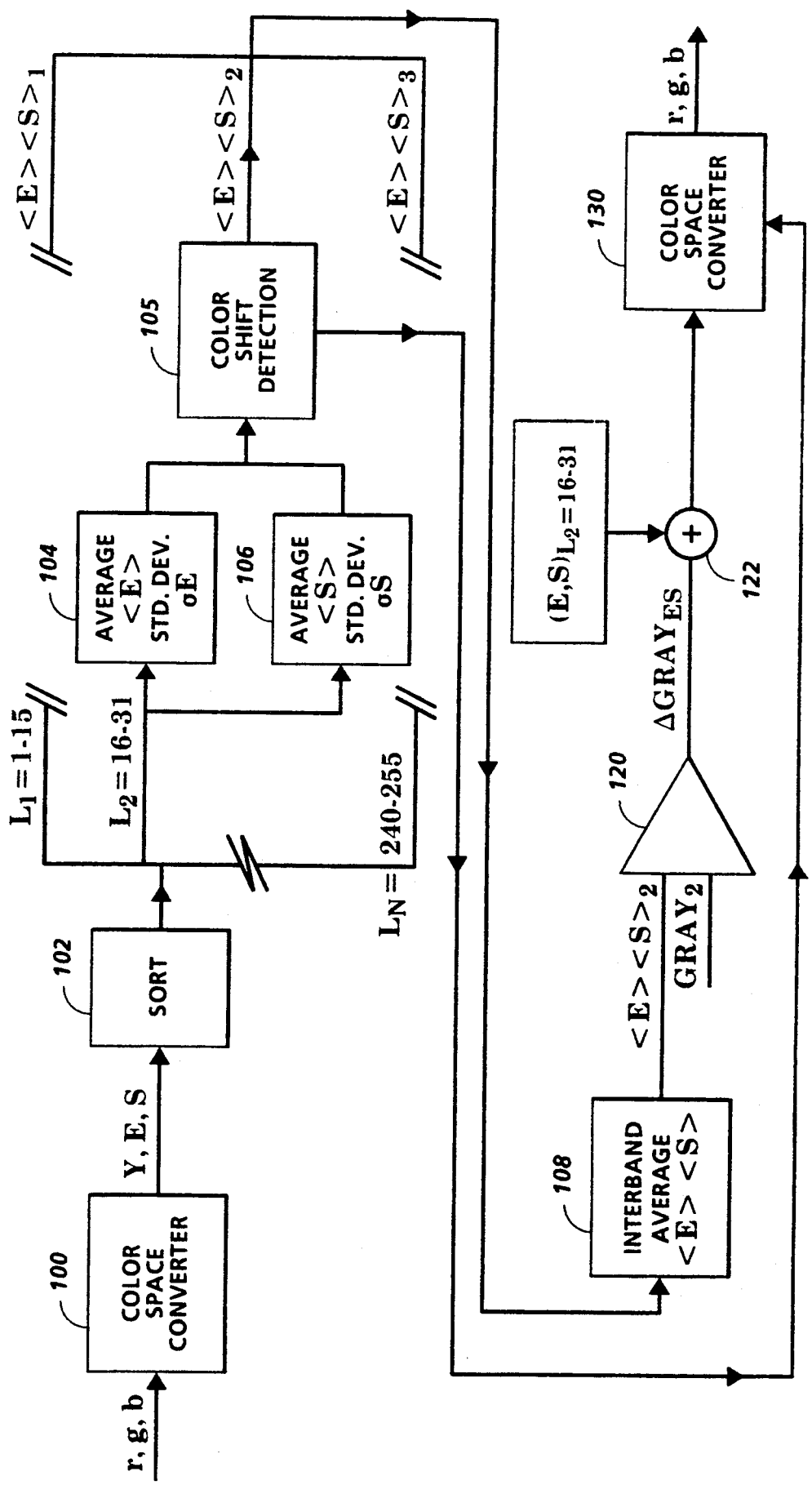
FIG. 2 shows a block diagram of a system accomplishing the present invention.

In accordance with the invention, and with reference to FIG. 2, the received signals, in this case r, g, b signals, are initially converted at color space converter 100 to a color space representation of the image in a luminance / chrominance system, where one value describing the image represents brightness and the remaining two values represent color. One such space that is preferred for the process is Xerox YES, as described in the above citation.

The YES described image signals are next sorted at sorter 102 by luminance signals into a plurality of luminance magnitude bands. Thus, for example, if the luminance signal is an 8 bit digital signal, as it is expected to be, the luminance signals might be sorted into 16 different bands, such as 0–15, 15–31, 32–47, ... 240–255. The bands do not have to be equal in size. Greater and lesser numbers of bands are desirable, although a number of bands greater than 1 is desired. A number of bands greater than 16 bands tends to produce artificial looking results.

Each of the bands are processed more or less the same way, and accordingly, only the band for luminance values 16–31 will be described. At each band, the E and S signals associated with L signals within the luminance magnitude band are averaged at averagers 104 and 106, thus deriving a band average, which for the second luminance band $L_2$ is designated $<E>_2$ and $<S>_2$, reflecting the integral signal of the color within a luminance magnitude band. This band average signal represents the band chrominance and will be used for determining the required color shift. Additionally, an optional measurement of the standard deviations $\sigma_E$ and $\sigma_S$ is taken in blocks 104 and 106 to aid the color shift detection in optional color shift detection block 150.

In order to soften what may be very disparate color shifts between bands, at interband averager 108, the band average $<E>_i$ and $<S>_i$ signals are also averaged with the band average $<E>_j$ and $<S>_j$ signals of a few of the adjacent bands. In the example of FIG. 2, $<E>_2<S>_2$ is averaged with $<E><S>_1$, and $<E><S>_3$. Interband averaging may be performed with the immediately adjacent band averages, with the immediate and second neighbors, only one neighbor or some other combination of band averages. It will not accomplish the goals of the invention however, to uniformly interband average with the entire set of band averages. The interband averaging arrangement may also use a weighting function, which weights the neighbors and therefore their contribution to the interband average.

The output of interband averager 108 is compared at comparator 120, which has as one input the signal $<E>_2<S>_2$ and as a second input, a signal representing the value of gray at the center of the luminance magnitude band which commonly equals Zero. The output of comparator 120 represents the difference in color values of $<E>_2<S>_2$ and neutral gray. This value is the color shift value which will be added to each signal within the luminance magnitude band to which it applies. At signal adder 122, the output of comparator 120, $\Delta Gray_{ES}$ is added to each value within the second luminance magnitude band $L_2$ or $L=16-32$.

The output of the signal adder 122 is directed to a second color space converter 130 so that the signal may be further processed, or to another output.

It has been determined that the described process works better when it is applied only to strongly color shifted natural scene images. It is known that images with very large color variations relative to the average chrominance are not likely to be strongly color shifted. Therefore, optionally provided is color shift detector 150. Signals from color space converter $<E>$, $<S>$ and $\sigma_E$, $\sigma_S$ are compared at block 150 to determine the relationship between the color shift $<E>$, $<S>$ and the color variation $\sigma_E$, $\sigma_S$. For strongly color shifted original images a good indication is that the average color shift $<E>$, $<S>$ of the individual luminance bands is in general larger than the color variation $\sigma_E$, $\sigma_S$. If color shift processing is not warranted, the color signals are directed immediately to an output such as color space converter 130.

Figure 3:
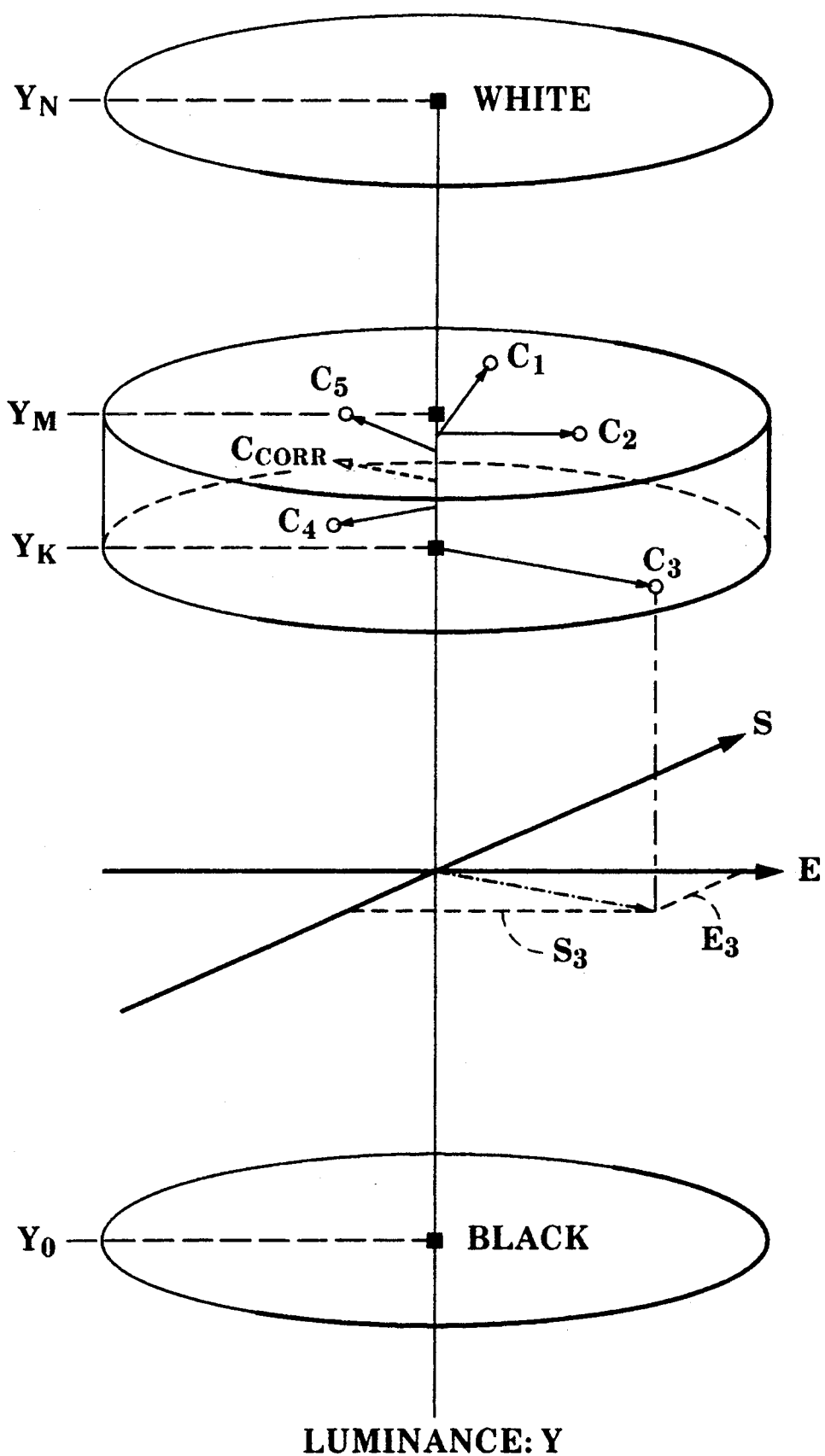
FIG. 3 shows the principle of the present invention operation.
Figure 4:
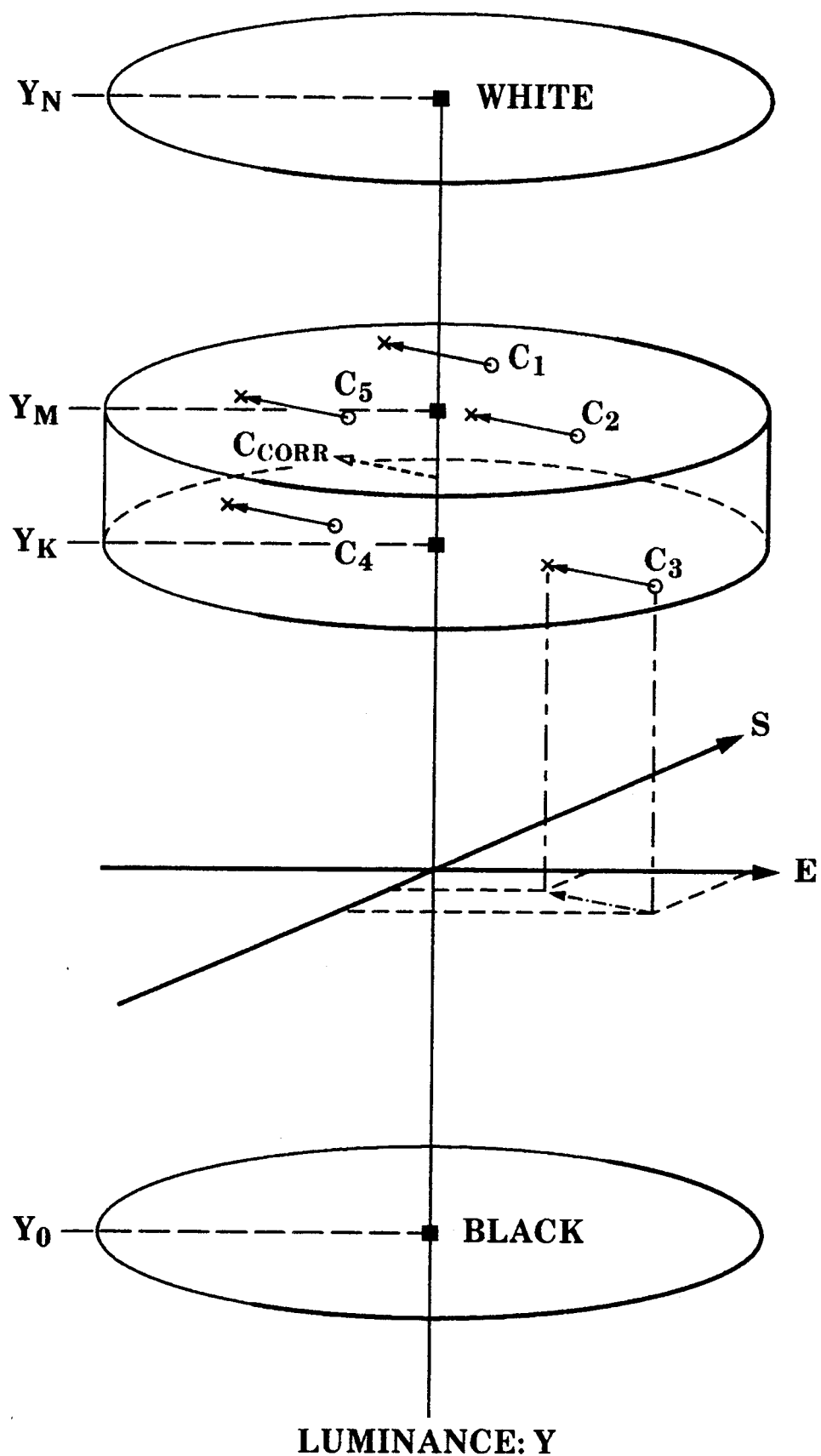
FIG. 4 shows the correction afforded by the present invention.

With reference now to FIGS. 3 and 4, the invention is shown graphically for improved understanding. FIG. 4 shows a section of color space, generally illustrated as a cylindrical solid, although it is understood that the gamut of real colors is a subset of the displayed cylindrical solid. The axis of the solid represents the luminance signal or gray values, varying from black to white. A ray C, extending from the solid represents chrominance given in FIGS. 3 and 4 as difference signals E (red minus green) and S (yellow minus blue). The axial length of the cylinder can be divided into a plurality of bands or parallel planes defined by the magnitude of the luminance signal. It can be seen that within a band defined by planes at $Y_K$ and $Y_M$, a plurality of colors $C_N$ are defined by their vector from the axis. If vectors $C_N$ are averaged, they provide a new band average vector $C_{corr}$ which has distance and direction from the axis. The band average vector may be averaged with one or more other average vectors (not shown).

With reference now to FIG. 4, the same section of color space is shown, illustrating the movement of each color $C_N$ by a distance and direction defined by the difference between the band average vector $C_{corr}$ and neutral gray. The colors of the image are thus changed.

It will no doubt be appreciated that the present invention can be accomplished through application software accomplishing the functions described, though a hardware circuit, which will probably provide optimum speed, or though some combination of software and hardware.

The invention has been described with reference to a particular embodiment. Modifications and alterations will occur to others upon reading and understanding this specification. It is intended that all such modifications and alterations are included insofar as they come within the scope of the appended claims or equivalents thereof.

I claim:

1. A method of correcting color shift produced by improper imaging in a natural scene image including the steps of:

converting an electronically encoded natural scene image described in terms of color density color space signals to an electronic encoding in terms of luminance and chrominance color space signals;

sorting each luminance color space signal forming the image into one of a plurality of predetermined luminance magnitude bands;

for each luminance magnitude band, calculating a band average chrominance signal from chrominance signals corresponding to luminance signals sorted into each band to determine an average color in each luminance magnitude band;

for each calculated band average chrominance signal, smoothing interband differences between band average chrominance signals for a plurality of luminance magnitude bands, by averaging each calculated band average chrominance signals with a plurality of the other calculated band average chrominance signals corresponding to the plurality of luminance magnitude bands to calculate an interband average chrominance value;

comparing each interband average chrominance value with neutral gray color signal to determine a color shift correction signal for a corresponding luminance magnitude band;

for each luminance magnitude band, adding the correction signal to the color of each signal in the band to shift the color of the natural scene image;

directing the color shifted signals to an output for viewing.

2. The method as defined in claim 1, wherein after sorting, the step of detecting strongly shifted color images is provided, including the steps of:

comparing variation in color of the natural scene image as defined by chrominance signals within a luminance magnitude band with the band average chrominance signal, to determine whether the image is strong color shifted; and directing the signals to an output if the comparison does not indicate a strongly color shifted color image.

3. The method as defined in claim 1, wherein the color density space is defined in terms of red-green-blue signals.

4. The method as defined in claim 1, wherein the luminance color space is defined in terms of Xerox YES signals.

5. The method as defined in claim 1, wherein the luminance and chrominance color space signals are defined in terms of 8 bit values, and the luminance signals so defined are sorted into approximately 16 bands.

6. The method as defined in claim 1, wherein the step of smoothing interband differences between band average chrominance signals, by averaging each given band average chrominance signals with a subset of the calculated band average chrominance signals to calculate an interband average chrominance value, includes the subset of weighting the contribution to the interband average chrominance value in accordance with the difference in value of the luminance magnitude of the luminance magnitude band.

7. A color shift correcting system for correcting the color shifts produced by improper imaging in a natural scene image comprising:

a source of electronically encoded natural scene images encoded in terms of color density color space signals;

a color space converter, receiving as an input the electronically encoded natural scene image and providing as an output an electronically encoding natural scene image in terms of luminance and chrominance color space signals;

a luminance signal sorter receiving as an input at least the luminance color space signals from the color space converter, and sorting each luminance color space signal forming the image to one of a plurality of predetermined luminance magnitude bands;

an averaging circuit, receiving as an input for each luminance magnitude band, the chrominance signals in that band, and producing as an output signal a band average chrominance signal representing an average color in the luminance magnitude band;

an interband averaging circuit, receiving as an input for each luminance magnitude band the calculated band average chrominance signal, and a subset of the calculated band average chrominance signals from other luminance magnitude bands, and producing as an output signal an interband average chrominance signal, whereby interband differences between band average chrominance signals for a plurality of luminance magnitude bands are smoothed;

a comparator, having as inputs each interband average chrominance value, and a signal representing neutral gray, and providing as an output a difference signal representing the different therebetween, whereby a color shift correction for a corresponding luminance magnitude band is determined;

a signal adder, having as inputs the difference signal, and the electronically encoded natural scene image in terms of luminance and chrominance color space signals for each luminance magnitude band to the difference signals, and producing as an output a color shifted signal;

directing the color shifted signals to an output.

8. The system defined in claim 7, additionally providing strongly shifted color image detector comprising:

a comparator having as inputs the chrominance signals for the sorted luminance signals and the band average chrominance signal, and producing an output signal indicative of whether the image is strong color shifted; and switching means for directing the electronically encoding natural scene image in terms of luminance/chrominance color space signals from the luminance signals sorter to an output if the comparator does not indicate a strongly color shifted color image.

9. The system as defined in claim 7, wherein the color density space is defined in terms of red-green-blue signals.

10. The system as defined in claim 7, wherein the luminance/chrominance color space is defined in terms of Xerox YES signals.

11. The system as defined in claim 7, wherein the luminance and chrominance color space signals are defined in terms of 8 bit values, and the luminance signals so defined are sorted into approximately 16 bands.

12. The system as defined in claim 7, wherein an interband averaging circuit smoothing interband differences between band average chrominance signals, averages each given band average chrominance signals with a subset of the calculated band average chrominance signals to calculate an interband average chrominance value, further comprises:

means for weighting the contribution to the interband average chrominance value of each of the subset of the calculated band average chrominance signals in accordance with the difference in value of the luminance magnitude with luminance magnitude of the given band average chrominance signal.

* * * * *